(12) United States Patent
Ricard et al.

(10) Patent No.: US 11,856,222 B2
(45) Date of Patent: Dec. 26, 2023

(54) METHOD AND APPARATUS FOR ENCODING/DECODING A POINT CLOUD REPRESENTING A 3D OBJECT

(71) Applicant: InterDigital VC Holdings, Inc., Wilmington, DE (US)

(72) Inventors: Julien Ricard, Cesson-Sevigne (FR); Joan Llach Pinsach, Cesson-Sevigne (FR); Kangying Cai, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 273 days.

(21) Appl. No.: 17/046,630

(22) PCT Filed: Apr. 1, 2019

(86) PCT No.: PCT/US2019/025130
§ 371 (c)(1),
(2) Date: Oct. 9, 2020

(87) PCT Pub. No.: WO2019/199510
PCT Pub. Date: Oct. 17, 2019

(65) Prior Publication Data
US 2021/0112277 A1    Apr. 15, 2021

(30) Foreign Application Priority Data

Apr. 11, 2018  (EP) .................................... 18305430
Aug. 23, 2018  (EP) .................................... 18306133

(51) Int. Cl.
*H04N 19/597*    (2014.01)
*G06T 9/00*    (2006.01)
*G06T 17/00*    (2006.01)

(52) U.S. Cl.
CPC ............. *H04N 19/597* (2014.11); *G06T 9/00* (2013.01); *G06T 17/00* (2013.01)

(58) Field of Classification Search
CPC .......... H04N 19/597; G06T 9/00; G06T 17/00
See application file for complete search history.

(56) References Cited

U.S. PATENT DOCUMENTS

| 7,003,136 B1 | 2/2006 | Harville |
| 2014/0204088 A1 | 7/2014 | Kirk et al. |

(Continued)

FOREIGN PATENT DOCUMENTS

| EP | 3 340 629 A1 | 6/2018 |
| KR | 101284137 B1 | 7/2013 |

(Continued)

OTHER PUBLICATIONS

Sinharoy et al., Lossless Coding in TMC2, Jan. 2018, international Organization for Standardization, ISO/IEC JTC1/SC29/WG11 (Year: 2018).*

(Continued)

*Primary Examiner* — Wednel Cadeau
(74) *Attorney, Agent, or Firm* — CONDO ROCCIA KOPTIW LLP

(57) ABSTRACT

This method comprises: —orthogonally projecting at least one point of a point cloud along projection lines; and —for at least two points of a same projection line, signaling in a bitstream whether a position of said projection line between a nearer and a farther points of said projection line is occupied or not.

20 Claims, 11 Drawing Sheets

(56) References Cited

U.S. PATENT DOCUMENTS

| | | |
|---|---|---|
| 2014/0285486 A1 | 9/2014 | Chang et al. |
| 2015/0381968 A1 | 12/2015 | Arora et al. |
| 2016/0275690 A1 | 9/2016 | Siddiqui et al. |
| 2016/0307368 A1 | 10/2016 | Akeley et al. |
| 2017/0214943 A1 | 7/2017 | Cohen et al. |
| 2017/0347055 A1 | 11/2017 | Dore et al. |
| 2017/0347120 A1 | 11/2017 | Chou et al. |
| 2019/0197739 A1* | 6/2019 | Sinharoy .................. G06T 7/55 |
| 2021/0174559 A1 | 6/2021 | Nakagami et al. |

FOREIGN PATENT DOCUMENTS

| | | |
|---|---|---|
| RU | 2421933 C2 | 6/2011 |
| WO | WO 2016003340 A1 | 1/2016 |
| WO | WO 2018039871 A1 | 3/2018 |
| WO | WO 2018050529 A1 | 3/2018 |
| WO | 2019/142163 A1 | 7/2019 |
| WO | 2019/142666 A1 | 7/2019 |

OTHER PUBLICATIONS

Cai et al., Signal multiple point along one projection line in PCC TMC2 Lossless Mode, Apr. 2018, International OrganisationforstandardisationorganisationinternationaledenormalisationISO/IECJTC1/SC29/WG 11Codingofmovingpicturesandaudio (Year: 2018).*

De Queiroz, Ricardo L., et. al. "Compression Of 3D Point Clouds Using A Region-Adaptive Hierarchical Transform". IEEE Transactions on Image Processing, Aug. 2016, vol. 25, No. 8, pp. 3947-395.

RU 2421933 C2, Cited in office action dated Sep. 23, 2021 issued in related Russian Application No. 2020136826.

Anonymous, "Call for Proposals for Point Cloud Compression V2", International Organization for Standardization, ISO/IEC JTC1/SC29/WG11, Coding of Moving Picture and Audio, Document MPEG2017/N16763, Hobart, Australia, Apr. 2017, 21 pages.

Hoppe et al., "Surface Reconstruction from Unorganized Points", SIGGRAPH '92: Proceedings of the 19th Annual Conference on Computer Graphics and Interactive Techniques, Jul. 1992, pp. 71-78.

Mammou, K. (Ed.), "PCC Test Model Category 2 v0", International Organization for Standardization, ISO/IEC JTC1/SC29/WG11, Coding of Moving Picture and Audio, Document N17248, Macau, China, Oct. 2017, 11 pages.

Sinharoy et al., "Lossless Coding in TMC2", International Organization for Standardization, ISO/IEC JTC1/SC29/WG11, Coding of Moving Picture and Audio, Document MPEG2018/m4217G, Gwangju, Korea, Jan. 2018, 10 pages.

Cai et al., "Signal Multiple Points along One Projection Line in PCC TMC2 Lossless Mode", International Organization for Standardization, ISO/IEC JTC1/SC29/WG11, Coding of Moving Picture and Audio, Document MPEG2018/m42652, San Diego, CA, United States, Apr. 2018, 4 pages.

Anonymous, "High Efficiency Video Coding", Series H: Audiovisual and Multimedia Systems, Infrastructure of Audiovisual Services—Coding of Moving Video, Recommendation ITU-T H.265 Standard, Telecommunication Standardization Sector of ITU, Dec. 2016, pp. 1-664.

He et al., "Best-Effort Projection Based Attribute Compression for 3D Point Cloud", 2017 23rd Asia-Pacific Conference on Communications (APCC), Perth, Australia, Dec. 11, 2017, 6 pages.

English Language Abstract, WO Patent Publication No. 2018039871, Mar. 8, 2018, 37 pages.

English Language Abstract, KR Patent Application No. 101284137, Jul. 10, 2013, 13 pages.

English Language Translation, Russia Patent No. 2421933 C2.

Cai et al., "Remove Occupancy Map Coding in PCC TMC2 Lossless Mode", ISO/IEC JTC1/SC29/WG11 MPEG2018/m42653, San Diego, CA, United States, Apr. 2018, 3 pages.

Golla et al., "Real-Time Point Cloud Compression", IEEE/RSJ International Conference on Intelligent Robots and Systems (IROS), Hamburg, Germany, Sep. 28, 2015, 6 pages.

ITU-T, "High Efficiency Video Coding", Recommendation ITU-T H.265, Series H: Audiovisual and Multimedia Systems, Infrastructure of Audiovisual Services—Coding of Moving Video, Feb. 2018, 692 pages.

Lee et al., "Development of Underwater Terrain's Depth Map Representation Method based on Occupancy Grids with 3D Point Cloud from Polar Sonar Sensor System", 2016 13th International Conference on Ubiquitous Robots and Ambient Intelligence (URA!), Xian, China, Aug. 19, 2016, pp. 497-500.

Levkovish-Maslyuk et al., "Depth Image-Based Representation and Compression for Static and Animated 3-D Objects", IEEE Transactions on Circuits and Systems for Video Technology, vol. 14, No. 7, Jul. 2004, pp. 1032-1045.

Plaza-Leiva et al., "Occupancy Grids Generation based on Geometric-Featured Voxel Maps", 23rd Mediterranean Conference on Control and Automation (MED), Torremolinos, Spain, Jun. 16, 2015, pp. 766-771.

* cited by examiner

METHOD AND APPARATUS FOR ENCODING/DECODING A POINT CLOUD REPRESENTING A 3D OBJECT

CROSS REFERENCE TO RELATED APPLICATIONS

This application is the national stage entry under 35 U.S.C. § 371 of International Application PCT/US2019/025130, filed Apr. 1, 2019, which was published in accordance with PCT Article 21(2) on Oct. 17, 2019, in English, and which claims the benefit of European Patent Application No. 18305430.3, filed Apr. 11, 2018, and European Patent Application No. 18306133.2, filed Aug. 23, 2018.

FIELD

The present principles generally relate to coding and decoding of a point cloud representing a 3D object. Particularly, but not exclusively, the technical field of the present principles is related to projection based encoding/decoding of a point cloud.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A point cloud is a set of points usually intended to represent the external surface of a 3D object but also more complex geometries like hair or fur that may not be represented efficiently by other data format like meshes. Each point of a point cloud is often defined by a 3D spatial location (X, Y, and Z coordinates in the 3D space) and possibly by other associated attributes such as color, represented in the RGB or YUV color space for example, a transparency, a reflectance, a normal vector, etc.

A colored point cloud may be a set of 6-components points (X, Y, Z, R, G, B) or equivalently (X, Y, Z, Y, U, V) where (X,Y,Z) defines the spatial location of a point in a 3D space and (R,G,B) or (Y,U,V) defines a color of this point.

In the following, the term "point cloud" refers to any point cloud including a colored point cloud.

Colored point clouds may be static or dynamic depending on whether or not the point cloud evolves with respect to time. It should be noticed that in case of a dynamic point cloud, the number of points is not necessary constant but, on the contrary, generally evolves with time. A dynamic point cloud is thus a time-ordered list of sets of points.

Practically, colored point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such colored point clouds are typically static and huge.

Another use case is in topography and cartography in which, by using 3D representations, maps are not limited to the plane and may include the relief.

Automotive industry and autonomous cars are also domains in which point clouds may be used. Autonomous cars should be able to "probe" their environment to take safe driving decisions based on the reality of their immediate neighboring. Typical sensors produce dynamic point clouds that are used by the decision engine. These point clouds are not intended to be viewed by a human being. They are typically small, not necessarily colored, and dynamic with a high frequency of capture. They may have other attributes like the reflectance that is a valuable information correlated to the material of the physical surface of the sensed object and may help the decisions.

Virtual Reality (VR) and immersive worlds have become a hot topic recently and foreseen by many as the future of 2D flat video. The basic idea is to immerse the viewer in an environment all round him by opposition to standard TV where he can only look at the virtual world in front of him. There are several gradations in the immersivity depending on the freedom of the viewer in the environment. Colored point clouds are a good format candidate to distribute VR worlds. They may be static or dynamic and are typically of average size, say no more than a few millions of points at a time.

Point cloud compression will succeed in storing/transmitting 3D objects for immersive worlds only if the size of the bitstream is low enough to allow a practical storage/transmission to the end-user.

It is also crucial to be able to distribute dynamic point clouds to the end-user with a reasonable consumption of bandwidth while maintaining an acceptable (or preferably very good) quality of experience. Similarly to video compression, a good use of temporal correlation is thought to be the crucial element that will lead to efficient compression of dynamic point clouds.

Well-known approaches project a colored point cloud representing the geometry and colors of a 3D object, onto the faces of a cube encompassing the 3D object to obtain videos containing texture representing the color information of the point cloud and depth information representing the geometry information of the point cloud, and code the texture and depth videos using a legacy encoder such as 3D-HEVC (an extension of HEVC whose specification is found at the ITU website, T recommendation, H series, h265, https://www.itu.int/rec/T-REC-H.265-201802-I annex I).

Performance of compression is close to video compression for each projected point, but some contents may be more complex because of occlusions, redundancy and temporal stability when dynamic point clouds are considered. Consequently, point cloud compression is more demanding than video compression in term of bit-rates.

Regarding occlusions, it is virtually impossible to get the full geometry of a complex topology without using many projections. The required resources (computing power, storage memory) for encoding/decoding all these projections are thus usually too high.

A point cloud codec using a texture and depth projection scheme has recently been proposed during the $120^{th}$ MPEG meeting. This scheme is described in the document ISO/IEC JTC1/SC29 WG11 Doc. N17248, Macau, CN, October 2017, in which the proposed scheme is called "Point cloud compression Test Model Category 2 version 0.0 (TMC2v0)".

This codec leverages existing video codecs to compress the geometry and texture information of a dynamic point cloud, by essentially converting the dynamic point cloud data into a set of different video sequences.

In particular, two video sequences, one for capturing the geometry information of the point cloud data and another for capturing the texture information i.e. the colors of points, are generated and compressed using existing video codecs, e.g. using the HEVC Main profile encoder.

Additional metadata that are needed to interpret the two video sequences, i.e., an occupancy map and auxiliary patch/block information, are also generated and compressed separately. The generated video bitstreams and the metadata are then multiplexed together so as to generate the final point cloud bitstream. The metadata are further encoded by an entropy codec such as an arithmetic codec.

The structure of an exemplary encoder 2 of this point cloud codec is represented on FIG. 1.

The encoder 2 comprises 3 main blocks: a geometry compression block 4, a metadata compression block 6 and a texture compression block 8.

The geometry compression block 4 comprises a depth patch creation block 10 which decomposes the input point cloud into depth patches.

The depth patch creation process 10 aims at decomposing the point cloud into a minimum number of depth patches with smooth boundaries, while also minimizing the reconstruction error. A depth patch represents one part of a point cloud by a group of pixels which are associated with depth values.

As an example, the following approach, detailed on FIG. 2, is implemented.

First, the normal at every point is estimated at 102 as described in Hugues Hoppe, Tony DeRose, Tom Duchamp, John McDonald, Werner Stuetzle, "Surface reconstruction from unorganized points". *ACM SIGGRAPH* 1992 *Proceedings*, 71-78.

An initial clustering of the point cloud is then obtained at 104 by associating each point with one of the following six oriented planes, defined by their normals:

(1.0, 0.0, 0.0),
(0.0, 1.0, 0.0),
(0.0, 0.0, 1.0),
(−1.0, 0.0, 0.0),
(0.0, −1.0, 0.0), and
(0.0, 0.0, −1.0).

More precisely, each point is associated with the plane that has the closest normal (i.e., maximizes the dot product of the point normal and the plane normal). According to one embodiment, the six oriented planes described above are indexed as follows:

(1.0, 0.0, 0.0) is indexed by cluster index 0;
(0.0, 1.0, 0.0) is indexed by cluster index 1;
(0.0, 0.0, 1.0) is indexed by cluster index 2;
(−1.0, 0.0, 0.0) is indexed by cluster index 0;
(0.0, −1.0, 0.0) is indexed by cluster index 1;
(0.0, 0.0, −1.0) is indexed by cluster index 2.

Each point is then associated with the index of the corresponding cluster.

The initial clustering is then refined by iteratively updating the cluster index associated with each point based on its normal and the cluster indices of its nearest neighbors. According to one embodiment, for a considered point, if all its neighboring points, for example all the points for which the distance to the current point in 3D space is less than 2, are assigned to one cluster, noted as ClusterA, and the considered point is assigned to anther cluster, the cluster index of the considered point is updated to ClusterA.

Then, depth patches are extracted at 106 by applying a connected component extraction procedure, i.e. extracting neighboring points with the same cluster index to form a connected component. According to one embodiment, one connected component is built by grouping all points satisfying the following two conditions at the same time:

All points have the same cluster index.

For each point in the concerned connected component, there exists at least one point in the same connected component whose distance to the current point is less than a predefined threshold, for example equal to 1.

Each connected component is associated with a projection plane according to its cluster index, i.e. the cluster index of the points belonging to it.

One embodiment is as follows.

YOZ plane for a connected component with cluster index 0;

XOZ plane for a connected component with cluster index 1;

XOY plane for a connected component with cluster index 2.

In order to better handle the case of multiple points along the same projection line, where a projection line comprises the points with two same coordinates among three coordinates (X, Y, Z). For example, a projection line could consist of all points with the same (X, Y) coordinates, two depth patches are generated for each connected component, recording depth values D0 and D1, corresponding to the minimum and maximum depth values of the corresponding pixel and satisfying D1−D0<=SurfaceThickness, where SurfaceThickness is the maximum surface thickness, for example equal to 4.

More precisely, let {H(u,v)} be the set of points of the current connected component that get projected to the same pixel (u,v). The first depth patch, also called the near layer, stores the depth of the point in {H(u,v)} with the lowest depth D0. The second depth patch, referred to as the far layer, captures the point in {H(u,v)} with the highest depth within the interval [D0, D0+SurfaceThickness].

The depth patch creation block 10 is followed by a packing block 12 which maps all the projected connected components onto a 2D grid while trying to minimize the unused space, and guaranteeing that every T×T (e.g. 16×16) block of the grid is associated with a unique projected connected component, where T is a user-defined parameter that is encoded in the bitstream and sent to the decoder. Each point on the 2D grid corresponds to a pixel on an image.

The packing uses a simple packing strategy that iteratively tries to insert patches into a W×H grid, where W and H are user defined parameters, for example 1028×1028, which correspond to the resolution of the geometry/texture images that will be encoded. The patch location is determined through an exhaustive search that is performed in raster scan order. The first location that can guarantee an overlapping-free insertion of the patch is selected and the grid cells covered by the patch are marked as used. If no empty space in the current image resolution can fit a patch, then the height H of the grid is temporarily doubled and search is applied again. At the end of the process, H is clipped so as to fit the used grid cells. The packing position, which is the position of the top left corner of the bounding-box of the projected area of each patch, in the 2D grid and the size of the projected area of each patch are signaled into the compressed bitstream.

An occupancy map is output from the packing block 12 to the metadata compression block 6. The occupancy map consists of a binary map that indicates for each cell of the grid whether it belongs to the empty space or to the point cloud, where one cell of the 2D grid would produce a pixel carrying depth or color information during the image generation process.

The geometry compression block 4 also comprises an image generation block 14 which exploits the 3D to 2D mapping computed during the packing process 12, more specifically the packing position and size of the projected area of each connected component, to store the geometry of the point cloud as images.

Corresponding to the fact that two depth patches are generated for each connected component, two images are generated to store the geometry of the point cloud, referred as DepthImg0 and DepthImg1.

The image generation block 14 of the encoder 2 is further detailed with reference to FIG. 3.

The image generation comprises a packing process (Depth D0 packing) in which, according to the packing position of the projected area of each patch, D0 values of each patch are copied to the corresponding part of the second grid.

The image generation also comprises a delta-depth determination in which, for each occupied pixel of depthImage0, delta_depth=D1−D0 (D1 and D0 being on the same projection line), and delta_depth is stored at the same position where the corresponding D0 value is stored.

The image generation also includes a time interleaving as follows: (depthImage0_0, depthImage1_0, depthImage0_i, depthImage1_i, depthImage0_n, depthImage1_n), where depthImage0_i and depthImage1_i are generated from point cloud frame i.

The image generation also comprises a padding process 20 that aims at filling the empty space between patches in order to generate a piecewise smooth image suited for video compression. It uses a simple padding strategy, which proceeds as follows:

Each block of T×T (e.g., 16×16) pixels is processed independently.

If the block is empty (i.e., all its pixels belong to an empty space), then the pixels of the block are filled by copying either the last row or column of the previous T×T block in raster order.

If the block is full (i.e., no empty pixels), nothing is done.

If the block has both empty and filled pixels, then the empty pixels are iteratively filled with the average value of their non-empty neighbors.

The image generation block 14 is followed by a depth video encoding block 22 wherein the generated depth images are stored as video frames and compressed using any legacy video codec such as the HM16.16 video codec according to the HM configurations provided as parameters.

In the metadata compression block 6 of the encoder 2, the following metadata, called per patch/connected-component metadata, is gathered then encoded for every connected component as follows:

Index of the projection plane
  Index 0 for the planes (1.0, 0.0, 0.0) and (−1.0, 0.0, 0.0);
  Index 1 for the planes (0.0, 1.0, 0.0) and (0.0, −1.0, 0.0);
  Index 2 for the planes (0.0, 0.0, 1.0) and (0.0, 0.0, −1.0).
2D bounding box (u0, v0, u1, v1) on the packed geometry/texture images;
3D location (x0, y0, z0) of the connected component represented in terms of depth shift $\delta 0$, tangential shift s0 and bi-tangential shift r0. According to the chosen projection planes, ($\delta 0$, s0, r0) are computed as follows:
  Index 0, $\delta 0$=x0, s0=z0 and r0=y0;
  Index 1, $\delta 0$=y0, s0=z0 and r0=x0;
  Index 2, $\delta 0$=z0, s0=x0 and r0=y0.

Also, mapping information providing for each T×T block its associated patch/connected component index, called as block-to-patch map, is generated and encoded as follows:
  For each T×T block, let L be the ordered list of the indexes of the patches such that their 2D bounding box contains that block. The order in the list is the same as the order used to encode the 2D bounding boxes. L is called the list of candidate patches.
  The empty space between patches on geometry/texture images is considered as a patch and is assigned the special index 0, which is added to the candidate patch list of all the blocks.
  Let I be index of the patch which occupies the current T×T block and let J be the position of I in L. Instead of explicitly encoding the index I, its position J is arithmetically encoded instead, which leads to better compression efficiency.

Also, the metadata compression block 6 implements an encoding of the occupancy map.

The occupancy map compression leverages the block-to-patch mapping information described above, in order to detect the empty T×T blocks (i.e., blocks with patch index 0). The remaining blocks are encoded as follows.

The occupancy map could be encoded with a precision of a B0×B0 blocks, where B0 is a user-defined parameter. In order to achieve lossless encoding, B0 should be set to 1. In practice, B0=2 or B0=4 result in visually acceptable results, while significantly reducing the number of bits required to encode the occupancy map.

The compression process of the occupancy map proceeds as follows:

Binary values are associated with B0×B0 sub-blocks belonging to the same T×T block. A value 1 is associated with a sub-block, if it contains at least a non-padded pixel, and 0 otherwise. If a sub-block has a value of 1 it is said to be full, otherwise it is an empty sub-block.

If all the sub-blocks of a T×T block are full (i.e., have value 1), the block is said to be full. Otherwise, the block is said to be non-full.

A binary information is encoded for each T×T block to indicate whether it is full or not.

If the block is non-full, an extra information indicating the location of the full/empty sub-blocks is encoded as follows:
  Different traversal orders are defined for the sub-blocks. FIG. 4 shows the four considered traversal orders.
  The encoder chooses one of the traversal orders and explicitly signals its index in the bitstream.
  The binary values associated with the sub-blocks are encoded by using a run-length encoding strategy.
    The binary value of the initial sub-block is encoded.
    Continuous runs of 0s and 1s are detected, while following the traversal order selected by the encoder.
    The number of detected runs is encoded.
    The length of each run, except of the last one, is also encoded.

Block-to-patch indices and occupancy map are called as per-block metadata.

The texture compression block 8 comprises a depth video decoding by a legacy decoder such as 3D-HEVC (an extension of HEVC whose specification is found at the ITU website, T recommendation, H series, h265, https://www.itu.int/rec/T-REC-H.265-201802-I annex I) followed by a geometry reconstruction process 24 that exploits the occupancy map information in order to detect the occupied pixels in the reconstructed geometry images. The 3D positions of the points associated with those occupied pixels are computed by levering the metadata and the geometry images. More precisely, let P be the point reconstructed from an occupied pixel (u, v) and let (δ0, s0, r0) be the 3D location of the connected component to which it belongs and (u0, v0, u1, v1) be the 2D bounding box of the corresponding depth patch. P could be expressed in terms of depth δ(u, v), tangential shift s(u, v) and bi-tangential shift r(u, v) as follows:

$$\delta(u,v) = \delta 0 + g(u,v)$$

$$s(u,v) = s0 - u0 + u$$

$$r(u,v) = r0 - v0 + v,$$

where g(u, v) is the luma component of the reconstructed geometry image.

The point cloud geometry reconstruction process 24 also outputs, for each reconstructed point, the position of the pixel which stores the depth value reconstructing the current point, i.e. (i, u, v), where i indicates the depth image, i.e. DepthImg0 or DepthImg1, and (u, v) are the coordinates of the pixel in the $i^{th}$ depth image.

The texture compression block 8 also includes a 3D color transfer block 26 in which the color and/or other attribute value, to be coded for each reconstructed point, is determined in a manner of minimizing color information coding error. According to one embodiment, for each reconstructed point, the color of its nearest point in the input/original point cloud is assigned as its color to be coded.

The 3D color transfer block 26 is followed by a texture image(s) generation block 28 generating texture images to be coded by storing the color information to be coded of each reconstructed point in the same position as in the geometry images, i.e. (i,u,v).

The texture image(s) generation block 28 is followed by a texture video encoding using a legacy encoder such as 3D-HEVC (an extension of HEVC whose specification is found at the ITU website, T recommendation, H series, h265, https://www.itu.int/rec/T-REC-H.265-201802-I annex I).

The depth video stream generated from the geometry compression block 4, the per block and per patch metadata streams generated from the metadata compression stream 6 and the color video stream generated from the texture compression block 8 are multiplexed in a compressed stream output from the encoder 2.

FIG. 5 represents a decoder 30 corresponding to the encoder 2 for the reconstruction of the point cloud.

At the decoder 30, the compressed stream output from the encoder 2 is demultiplexed into a depth video stream, a per block metadata stream, a per patch metadata stream and a color video stream.

The decoder 30 comprises a geometry reconstruction block 31 which includes a depth video decoding by a legacy decoder such as 3D-HEVC (an extension of HEVC whose specification is found at the ITU website, T recommendation, H series, h265, https://www.itu.int/rec/T-REC-H.265-201802-I annex I).

The image reconstruction block 31 also includes an image reconstruction block 32 that is detailed in FIG. 6. This block comprises:
time-deinterleaving reconstructed depthImage0 and reconstructed depthImage1 from the reconstructed depth video stream;
retrieving reconstructed D0 values stored in reconstructed depthImage0; and
reconstructing D1 values using reconstructed_D0+reconstructed_Delta_Depth, where reconstructed_Delta_Depth values are stored in depthImage1.

The image reconstruction block 31 also includes a point cloud geometry reconstruction block 33 operating in the same manner as the point cloud geometry reconstruction block 24 of the encoder 2.

The decoder 30 also includes a metadata reconstruction block in which per patch and per block metadata are decoded.

The decoder 30 further includes a texture reconstruction process including a texture video decoding stage by a legacy decoder such as 3D-HEVC (an extension of HEVC whose specification is found at the ITU website, T recommendation, H series, h265, https://www.itu.int/rec/T-REC-H.265-201802-I annex I).

The texture reconstruction process also includes a texture patch reconstruction stage in which texture patches are reconstructed using the reconstructed per patch and per block metadata.

Further, the texture reconstruction process includes a point cloud texture reconstruction stage 35 in which the color of each reconstructed point is fetched from the reconstructed texture images using the position of the pixel reconstructing each point.

As shown in FIG. 7, there are usually more than one point along the same projection line. The reasons behind that comprise:
The representation of continuous 3D surface by points with integer coordinates, and/or
Local surface details, and/or
Self occlusion.

In order to minimize the reconstruction error, the above described codec keeps two depth values for each pixel of one projection image. Said two depth values are called as depth D0 and depth D1, corresponding to the minimum and maximum depth values along the corresponding projection line and satisfying D1−D0<=SurfaceThickness, where SurfaceThickness is the maximum surface thickness.

Correspondingly, the encoder 2 generates two depth images for each point cloud frame (i.e., in the case of a dynamic point cloud, a point cloud in a sequence of point clouds), where a first depth image DepthImg0 stores the depth D0 values and a second depth image DepthImg1 stores the values of delta_depth=depth D1-depth D1. It shall be noted that depth D1 is set to be equal to depth D0 when there is only one point along the projection line.

However, by using the encoder of FIG. 1, the points of the point cloud, called un-projected points on FIG. 7, which are between the two recorded ones are not encoded which results in significant objective and subjective quality loss.

SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

Generally speaking, the present disclosure proposes a solution for improving the situation.

Accordingly, the present disclosure provides a method comprising orthogonally projecting at least one point of a point cloud along projection lines; and for at least two points of a same projection line, signaling in a bitstream whether a position of said projection line between a nearer and a farther points of said projection line is occupied or not.

Advantageously, the present disclosure improves the compression performance of a depth and texture projection based point cloud codec by signaling in a bitstream whether a position of a projection line between a nearer and a farther points of said projection line is occupied or not.

The present disclosure also provides a method comprising reconstructing two points of a point cloud by orthogonally de-projecting a nearer and a farther point of a same projection line; and reconstructing a point of the point cloud by orthogonally de-projecting a point of said projection line when an information indicates that the position of said point is occupied.

The encoder/decoder are advantageously implemented by one or more processors.

The methods according to the disclosure may be implemented in software on a programmable apparatus. They may be implemented solely in hardware or in software, or in a combination thereof.

Since the present invention can be implemented in software, the present invention can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The disclosure thus provides a computer-readable program comprising computer-executable instructions to enable a computer to perform the encoding/decoding method of the invention.

BRIEF DESCRIPTION OF DRAWINGS

In the drawings, examples of the present principles are illustrated. It shows.

Similar or same elements are referenced with the same reference numbers.

DESCRIPTION OF EXAMPLES OF THE PRESENT PRINCIPLES

Figure 1:
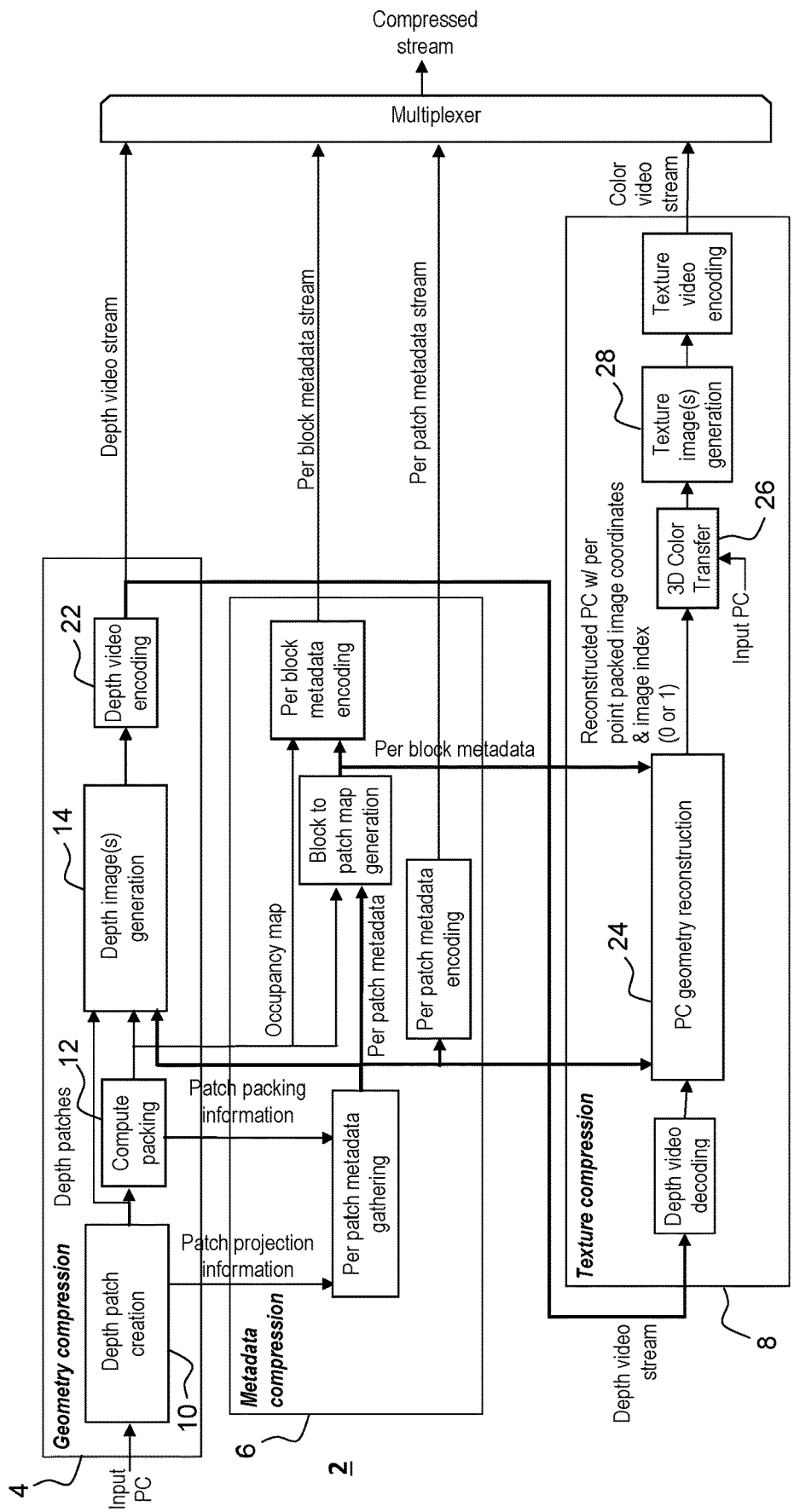
FIG. 1 already described shows an encoder in which the present principles may be advantageously implemented.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for encoding/decoding a colored point cloud but extends to the encoding/decoding of a sequence of colored point clouds because each colored point cloud of the sequence is sequentially encoded/decoded as described below.

According to an embodiment, the encoder 2 and the decoder 30 already described are used for the implementation of the present principles.

Figure 7:
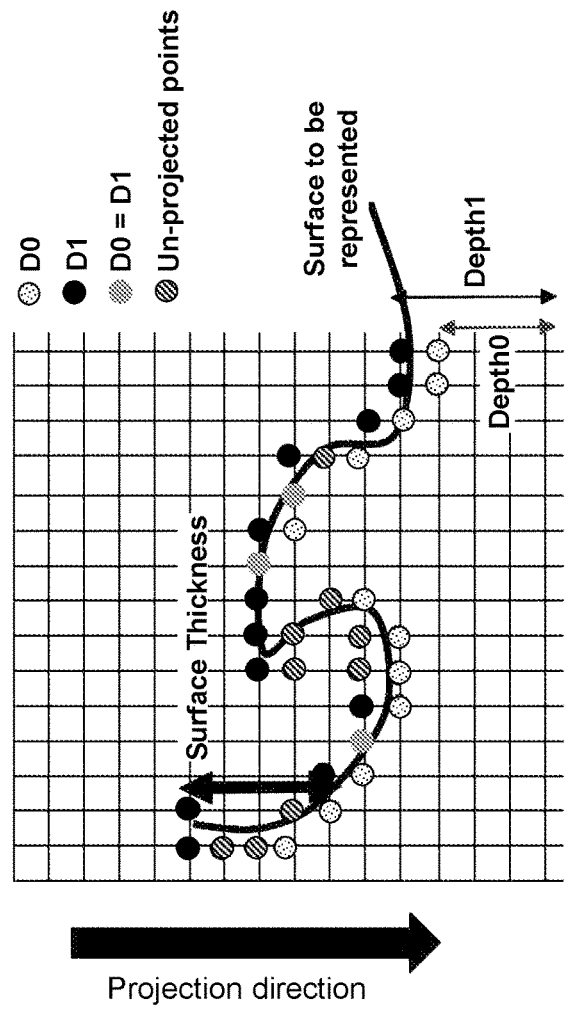
FIG. 7 already described is a 2D illustration of 3D point cloud showing depth D0 and depth D1 values of the pixels of the projected image according to the prior art.

As explained above with reference to FIG. 7, there are usually more than one point along the same projection line. In order to minimize the reconstruction error, two depth values are stored for each pixel of one projection image. Said two depth values are called as depth D0 and depth D1, corresponding to the minimum and maximum depth values.

Correspondingly, the encoder 2 generates two depth images for each point cloud frame, called DepthImg0 and DepthImg1. In the encoder 2, the points, called un-projected points, between the recorded points corresponding to depth D0 and depth D1 are not encoded.

Figure 8:
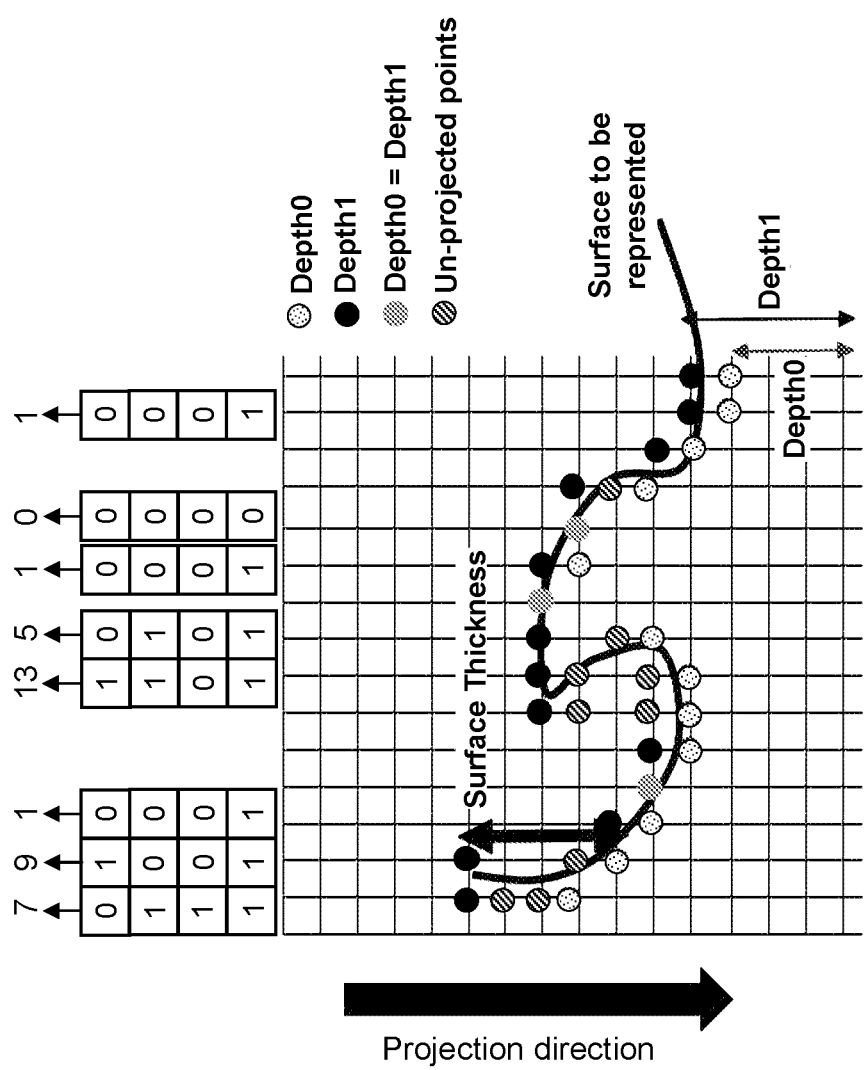
FIG. 8 illustrates enhanced-delta-depth (EDD) codes according to an embodiment of the present disclosure.

Advantageously, according to the present principles, these un-projected points are encoded, as this appears on FIG. 8 by:
- along all projection lines with at least one point, for each position between depth D0 and depth D1, using one bit to indicate whether or not this position is occupied,
- concatenating all said bits along one projection line to form a codeword, called as Enhanced-Delta-Depth (EDD) code hereafter,
- packing EDD codes of a point cloud frame into one or more images which will be further coded by mature video codecs such as HEVC.

To integrate EDD codes in the encoder 2, instead of coding DeltaD=(D1−D0) in DepthImg1, EDD codes of all projection lines with at least one point are recorded and encoded in DepthImg1.

Figure 9:
FIG. 9 shows examples of forming an enhanced-delta-depth (EDD) code according to an embodiment of the present disclosure.

As represented on FIG. 9, the present disclosure proposes two embodiments for concatenating all bits representing all positions between depth D0 and depth D1 along one projection line to form an EDD code.

One embodiment takes the bits representing the position near depth D0 as the higher bits of the resultant codeword, and the bits representing the position near depth D1 as the lower bits of the resultant codeword, as shown in the right part of FIG. 9.

Another embodiment takes the bits representing the position near depth D1 as the higher bits of the resultant codeword, and the bits representing the position near depth D0 as the lower bits of the resultant codeword, as shown in the left part of FIG. 9. The examples on the top of FIG. 8 are constructed using this embodiment shown in the left part of FIG. 9.

Figure 10:
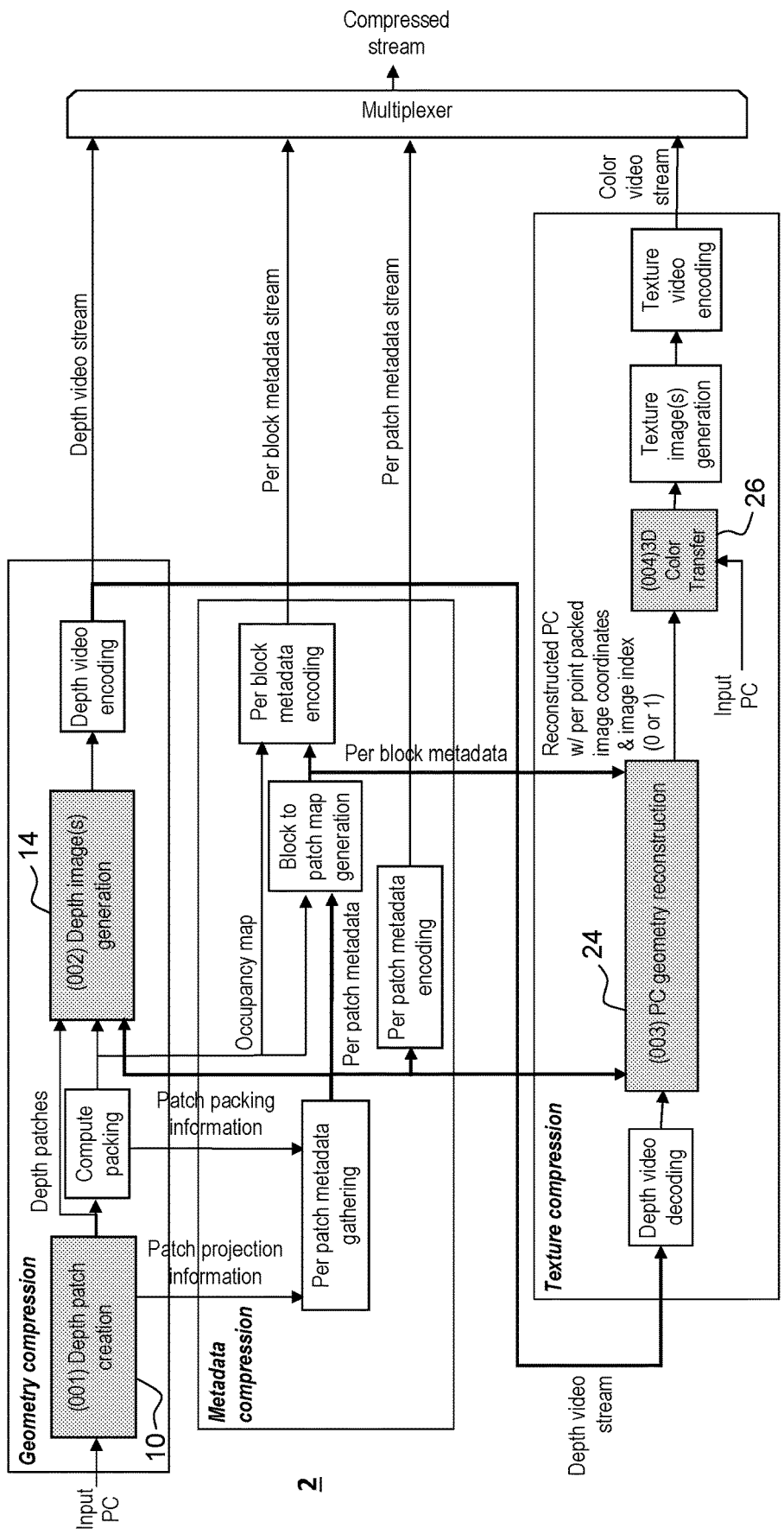
FIG. 10 shows an encoder according to an embodiment of the present disclosure.

FIG. 10 shows the encoder 2 modified in accordance with the teachings of the present disclosure. More particularly, the blocks of depth path creation 10, depth image(s) generation 14, point cloud geometry reconstruction 24 and 3D color transfer 26 of the encoder 2 are modified according to embodiments of the present disclosure.

Figure 2:
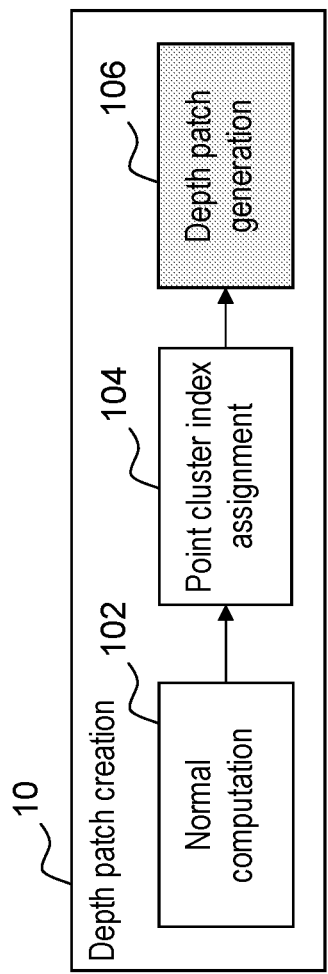
FIG. 2 already described illustrates the depth patch creation process of the prior art.

In the depth patch creation block 10, represented on FIG. 2, the depth patch generation block 106 is modified. Instead of just recording D0 and D1 along each projection line, the points between D0 and (D0+surfaceThickness) are recorded by an EDD code. The two depth patches of each connected-component record D0 and EDD codes.

Figure 3:
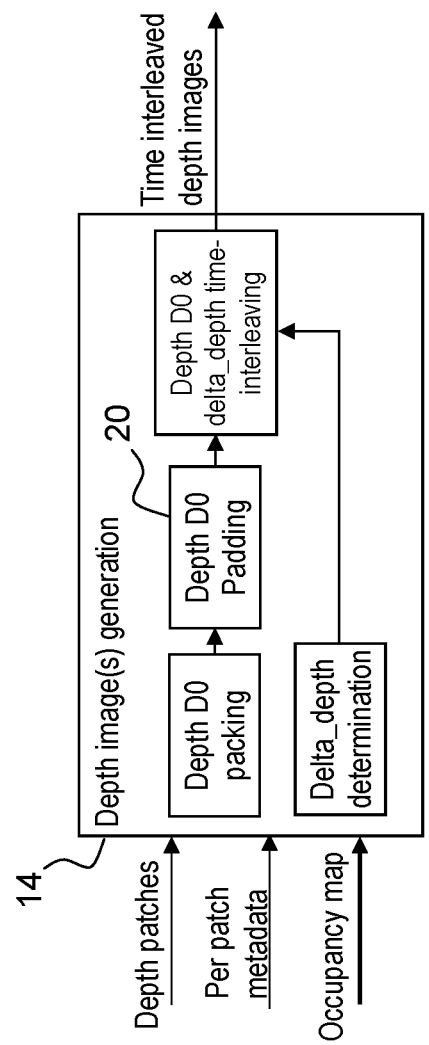
FIG. 3 already described illustrates the image generation process of the prior art.
Figure 4:
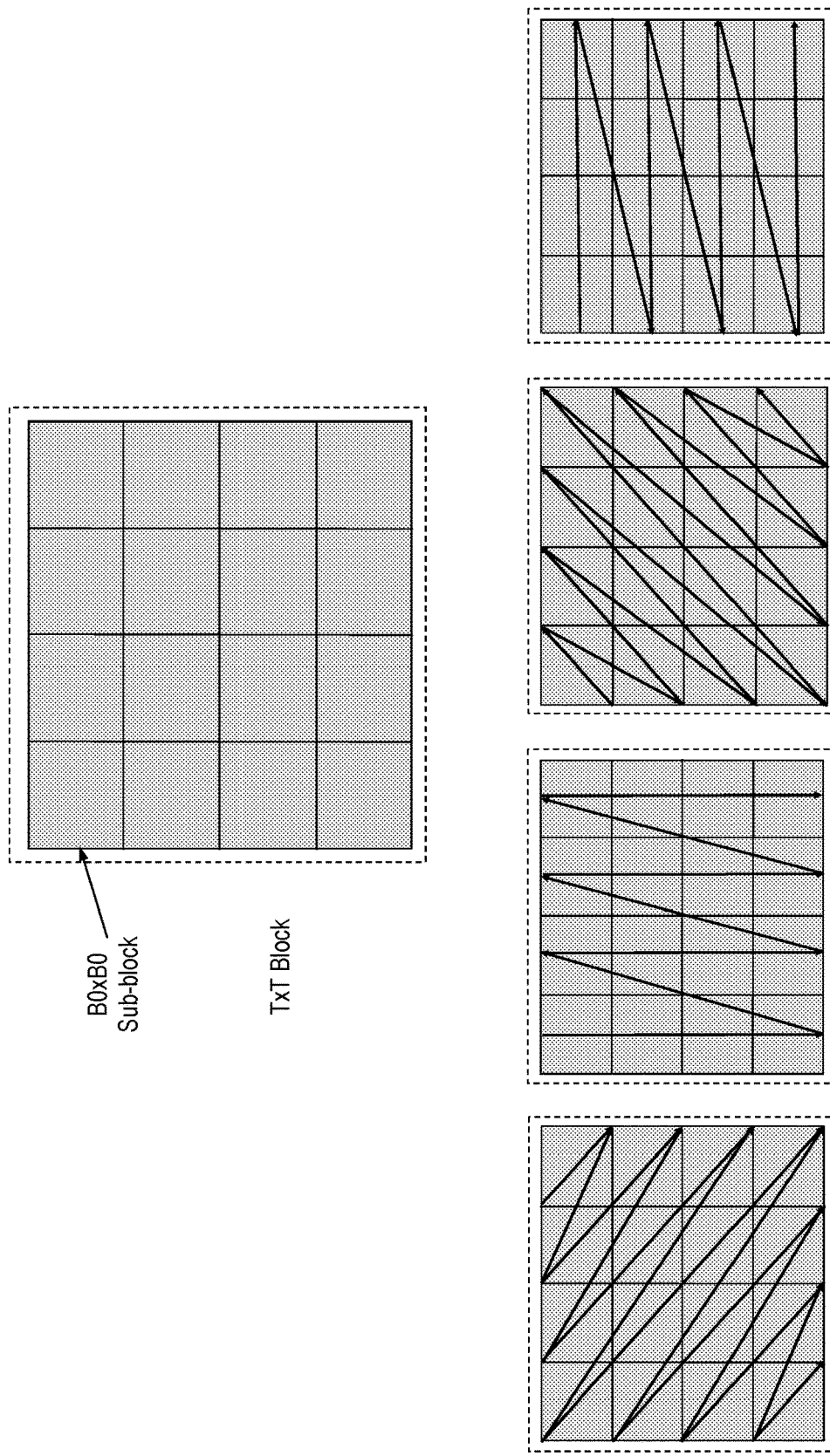
FIG. 4 already described shows examples of sub-blocks traversals used in the encoder of FIG. 1.

The depth image(s) generation block 14, represented on FIG. 3 is also modified by recording EDD codes in DepthImg1 instead of D1. Two embodiments for recording EDD codes in DepthImg1 are presented on FIGS. 11 and 12.

Figure 11:
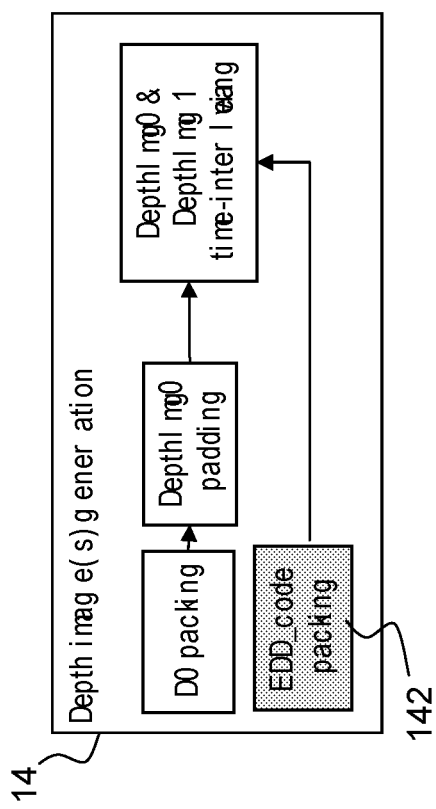
FIG. 11 shows the block of depth images reconstruction according to a first embodiment of the present disclosure.

According to the first embodiment, represented on FIG. 11, all the EDD codes are packed at 142, using the per-block metadata, in DepthImg1.

Figure 12:
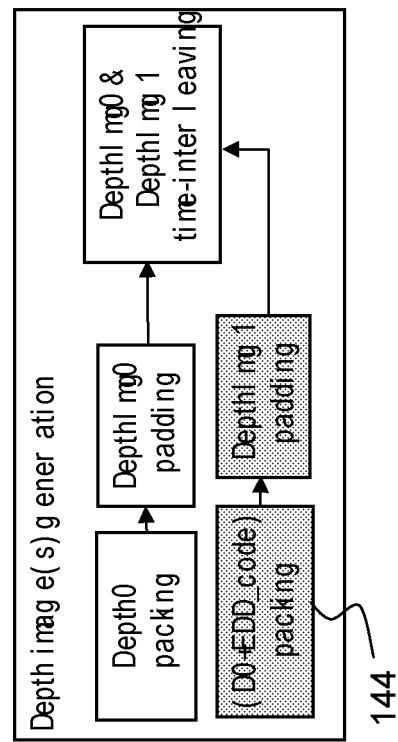
FIG. 12 shows the block of depth images reconstruction according to a second embodiment of the present disclosure.

According to the second embodiment, represented on FIG. 12, (D0+EDD_code) is packed at 144, using the per-block metadata, in DepthImg1. DepthImg1 is then padded to improve its compression performance.

Advantageously, the point cloud geometry reconstruction block 24 is also modified.

Points reconstructed from decoded D0 values and decoded EDD codes constitute the reconstructed point cloud (geometry only). If there are more than two reconstructed points along one projection line, the reconstructed points between the two points with minimum and maximum reconstructed depth values are called in-between reconstructed points.

As the point cloud geometry reconstruction block 24 determines how to pack the color values of the reconstructed points, the modification of this block 24 also enables to deal with the color of the reconstructed in-between points.

Besides the reconstructed point cloud geometry, the output of this block 24 also includes per-point packed image coordinates, which, for each point, indicate the position in the two texture images to store the color value of the current point to be coded. Except the in-between reconstructed points, the per-point packed image coordinates of the other reconstructed ones, i.e. points corresponding to D0 and D1, are determined in the same way as described for the encoder 2.

Two embodiments are proposed to deal with the color of said in-between reconstructed points.

According to a first embodiment, the color of said in-between reconstructed points is not signaled in the compressed bitstream. The decoder will determine the reconstructed color of said in-between reconstructed points based on their adjacent points with color reconstructed from the bitstream, for example, through interpolation. Using this embodiment, the per-point packed image coordinates of these reconstructed points are set as (NULL, NULL, NULL). NULL is some invalid image position value, such as −1.

According to a second embodiment, the color of said in-between reconstructed points is signaled in the compressed bitstream. The color of said in-between reconstructed points to be signaled is determined in the 3D color transfer block 26 in the same manner as the other reconstructed points. The color of the in-between reconstructed points is stored in the texture image blocks un-occupied by any patches, which can be interpreted from the per-block metadata, in TexImg0 and/or TexImg1 which are two images corresponding to DepthImg0 and DepthImg1 storing color information to be coded. The packed image positions of the in-between reconstructed points are determined based on their reconstructed positions. An example is as follows.

At a first step, all un-occupied blocks in DepthImage0 and DepthImage1 are sorted into a list. There are two possibilities, un-occupied blocks in DepthImage0 are sorted before or after DepthImage1 in the sorted un-occupied block list. The un-occupied blocks in the same image are sorted by their (uMin, vMin) (in the YUV color space).

At a second step, whenever a new in-between point is reconstructed during the geometry reconstruction step, its per-point packed image position is the first unoccupied pixel of the first un-occupied block in the sorted un-occupied block list. An originally un-occupied block is deleted from the sorted un-occupied block list if it has been fully occupied by in-between points.

Advantageously, the 3D color transfer block 26 is also modified. In this block, the color determination of the points with packed image positions (NULL, NULL, NULL) is omitted.

Compared with the prior art encoder of FIG. 1, the following metadata are advantageously added to the bitstream output by the encoder of FIG. 10:
  one bit indicating whether or not the new coding scheme described in the current disclosure is used. For example, 1 means that it is used and 0 means the contrary.
  If the first bit is equal to 1, the following items follow:
    a certain number of bits, for example 3 bits, to indicate the value of SurfaceThickness.
    one bit to indicate that DepthImg1 records EDD codes or (D0+EDD_codes). For example, 0 means that EDD codes are recorded and 1 means that (D0+EDD_codes) are recorded.
    one bit to indicate how an EDD code is constructed, i.e. which embodiment shown in FIG. 9 is used to construct an EDD code signaled in the compressed bitstream. For example, 0 means that the embodiment shown in the left part of FIG. 9 is used while 1 means that the embodiment shown in the right part of FIG. 9 is used.
    one bit to indicate whether or not the color of the in-between points is signaled in the compressed bitstream. For example, 1 means yes and 0 means no. This bit is called as CodeInBetweenColor bit.
    If the CodeInBetweenColor bit is 1, one bit to indicate the packing of the color of in-between reconstructed points is started from TexImg0 or TexImg1. For example, 1 means to use TexImg1 first and 0 means to use TexImg0 first.

The above new metadata brought by the new coding scheme proposed can be signaled once for the whole bitstream, or multiple times for each frame or each group of frames being compressed together, which allows selecting different coding schemes for each frame or group of frames. The data field(s) recording value(s) of the above metadata can be directly output to the compressed bitstream(s) or further entropy coded before output to the compressed bitstream(s).

Figure 5:
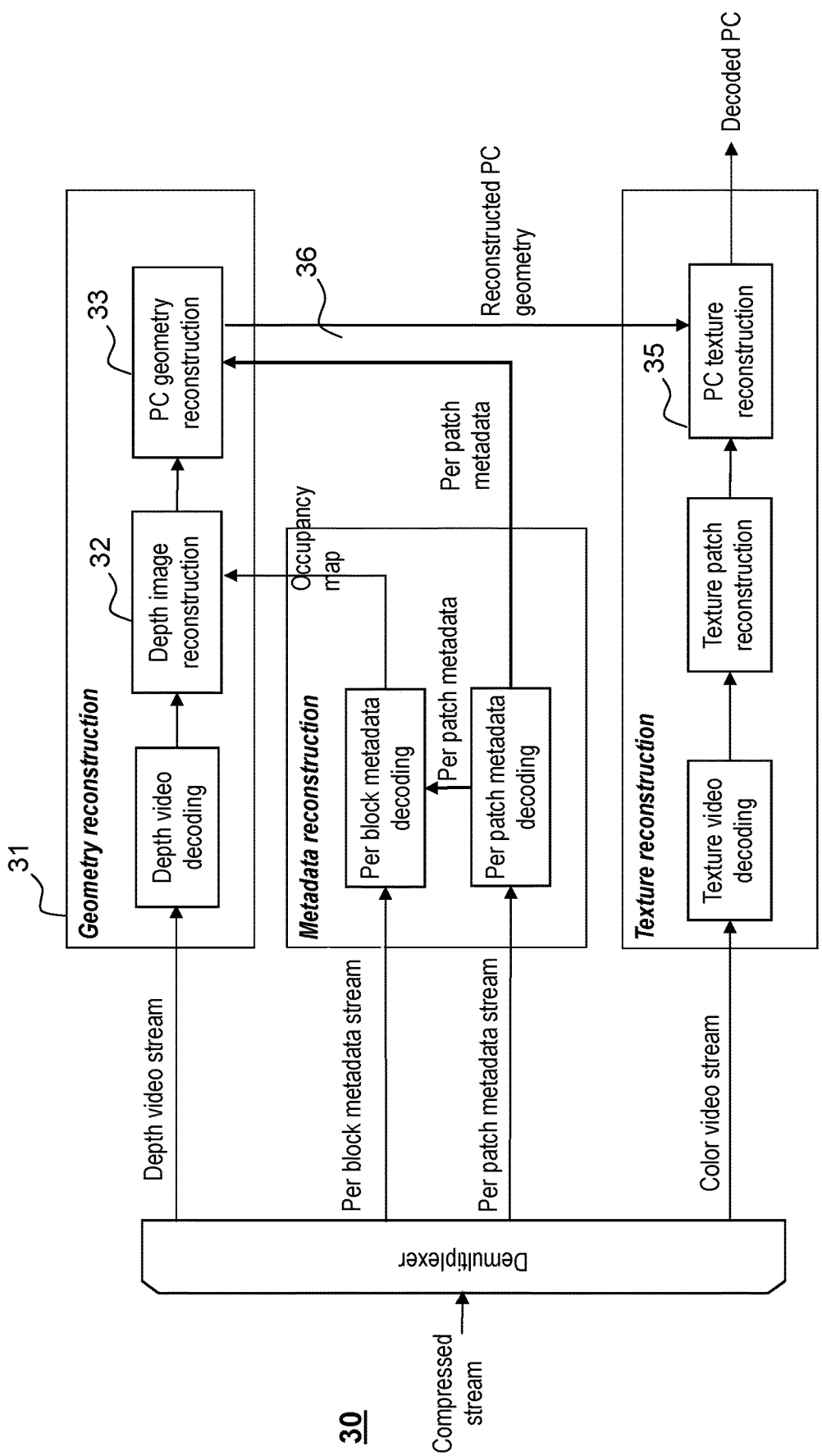
FIG. 5 already described shows a decoder in which the present principles may be advantageously implemented.
Figure 6:
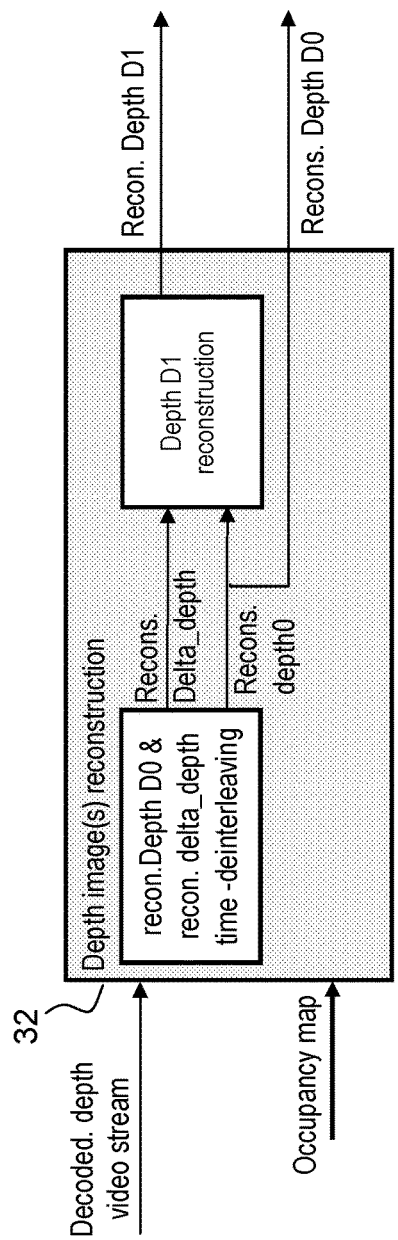
FIG. 6 already described illustrates the image reconstruction process of the prior art.
Figure 13:
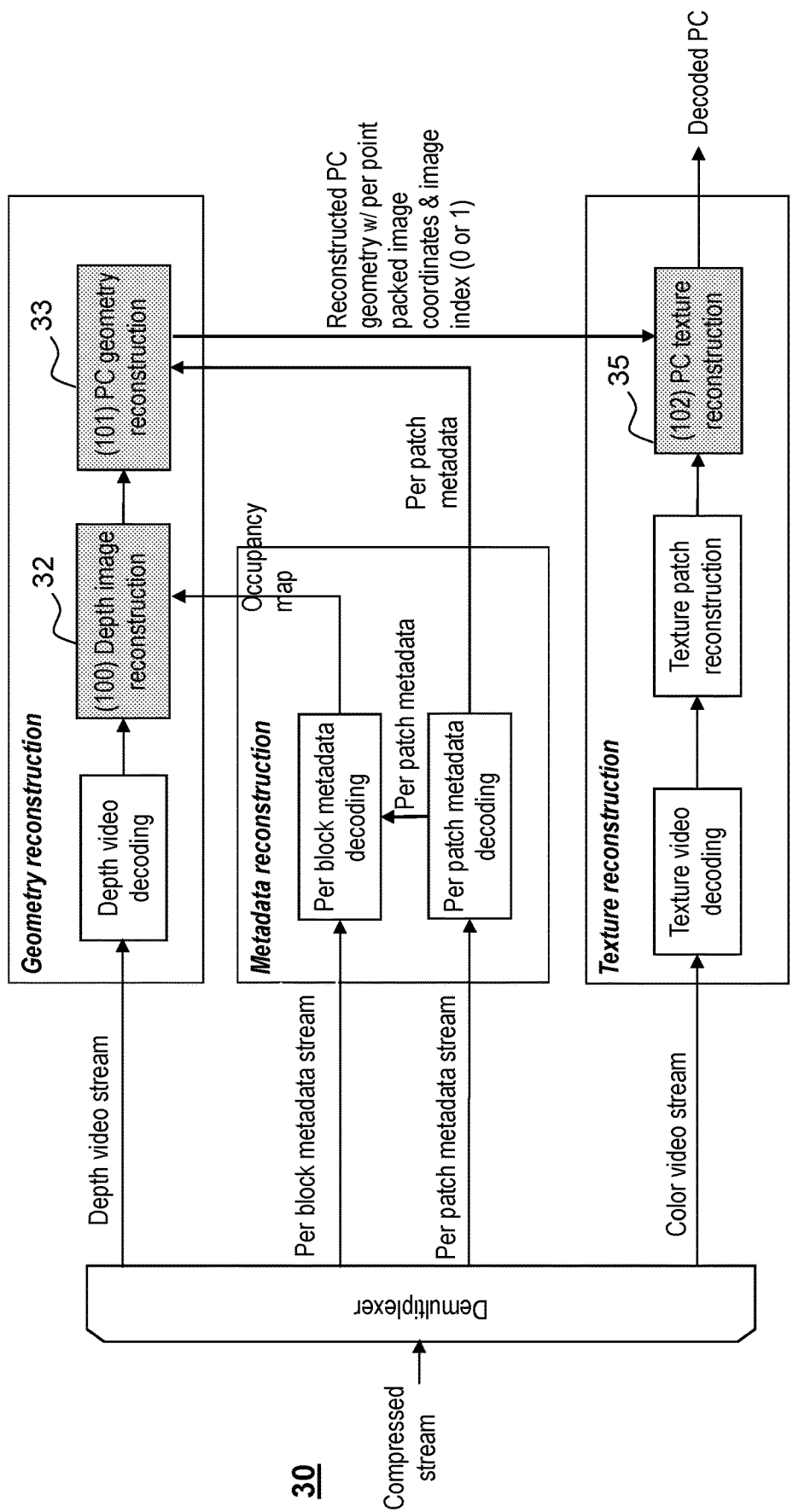
FIG. 13 shows modifications of the decoder of FIG. 5 according to an embodiment of the present disclosure.

FIG. 13 shows the decoder 30 of FIG. 5 modified in accordance with the teachings of the present disclosure. More particularly, the blocks of depth image reconstruction 32, point cloud geometry reconstruction 33 and point cloud texture reconstruction 35 of the decoder 30 are modified according to embodiments of the present disclosure.

Concerning the depth image reconstruction block 32, the output of this block includes the reconstructed D0 values and reconstructed EDD codes. The reconstructed D0 values can be read from the reconstructed DepthImg0. If DepthImg1 stores EDD codes directly, the reconstructed EDD codes can be directly read from reconstructed DepthImg1. If DepthImg1 stores (D0+EDD_codes), the EDD codes can be reconstructed from subtracting reconstructed D0 from reconstructed DepthImg1.

Concerning the point cloud geometry reconstruction block 33, the same changes as the changes in the encoder side block 24 are implemented.

Concerning the point cloud texture reconstruction block 35, the color of the in-between reconstructed points is reconstructed either by interpolation or read from the reconstructed texture image.

Figure 14:
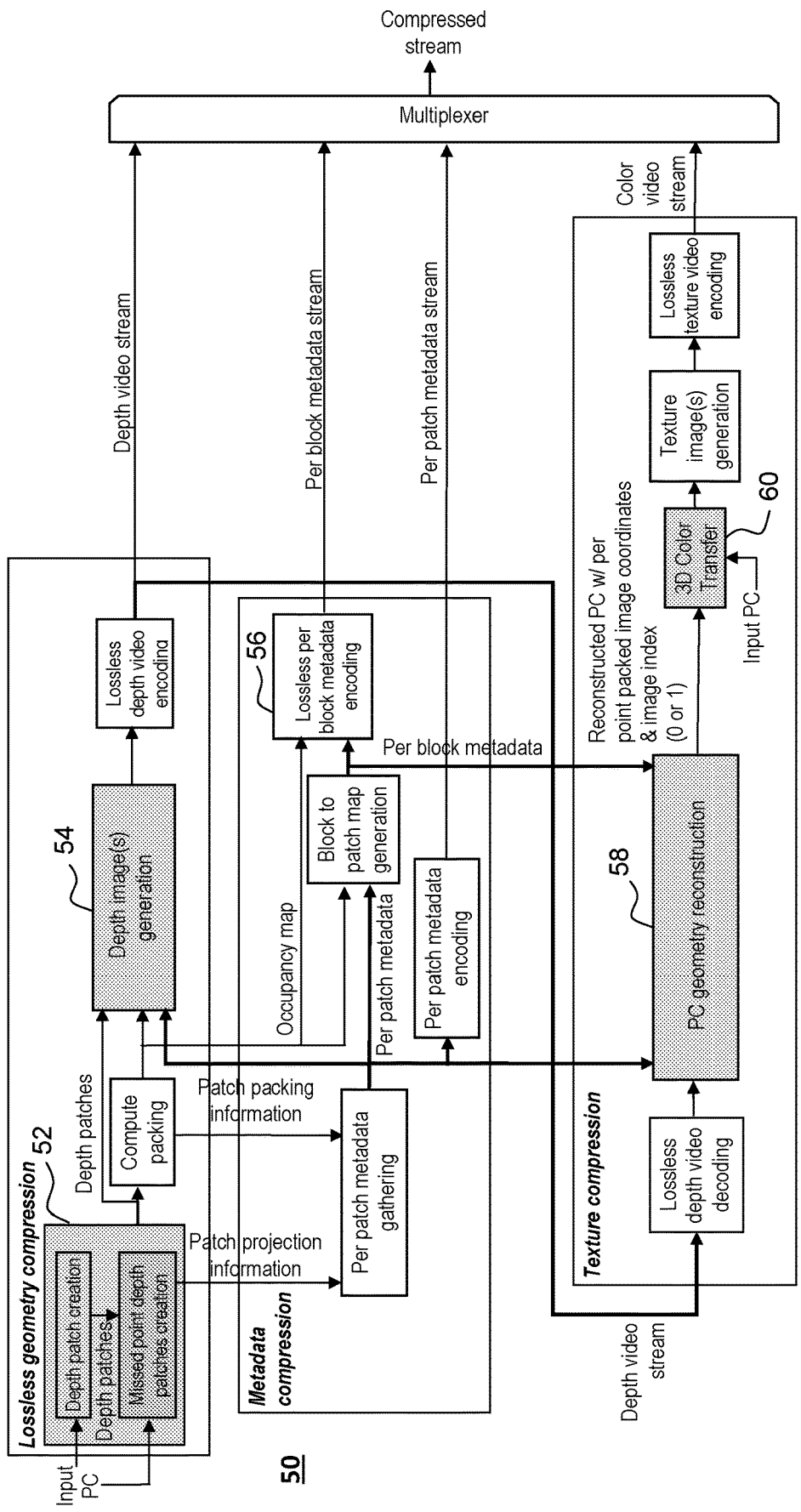
FIG. 14 shows a lossless encoder in which the present principles may be advantageously implemented.

According to a further embodiment of the disclosure, the EDD codes are advantageously used in a lossless encoder 50 as represented on FIG. 14.

This lossless encoder corresponds to a lossless version of the encoder 2 of FIG. 1 for which further details may be found in the document ISO/IEC JTC1/SC29/WG11 MPEG2018/m42170, January 2018, Gwangju, Korea.

The basic idea of this lossless encoder 50 is to construct a special connected component which consists of all points missed by, i.e. not included in any of, the connected components built by the encoder 2. Then two extra depth patches and two extra texture patches corresponding to the missed point patch are packed in the depth and texture images.

More particularly, the first step towards extending the encoder 2 for lossless geometry coding is to capture the missing points and create a separate connected component called missingPointsPatch.

Next, the x, y, and z coordinates of the points in the missingPointsPatch are arranged into blocks and embedded into the three color channels Y, U and V of the geometry frame.

Next, the location and size of the missingPointsPatch are output using the mechanisms of the encoder 2 and a dummy patch which reflects the dimensions and location of the missingPointsPatch is added to the existing list of patches. During the compression of the occupancy map, this information is encoded along with the information about the other regular patches and sent to the decoder.

Finally, before the reconstruction of the point cloud from the compressed geometry frames, the location and dimension of the missingPointsPatch is extracted from the dummy patch. This information, along with the occupancy map, is used to recover the spatial coordinates of the 3D points from the three color planes. Simultaneously, the majority of the points from the list of patches are recovered at the decoder and projected back to the 3D space using the existing scheme.

The teachings of the present disclosure may be advantageously applied to the lossless encoder 50 by modifying the highlighted blocks depth patch creation 52, depth image(s) generation 54, point cloud geometry reconstruction 58 and 3D color transfer 60 in the same manner as described with reference to FIG. 10 for the encoder 2.

On FIG. 1-14, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 15:
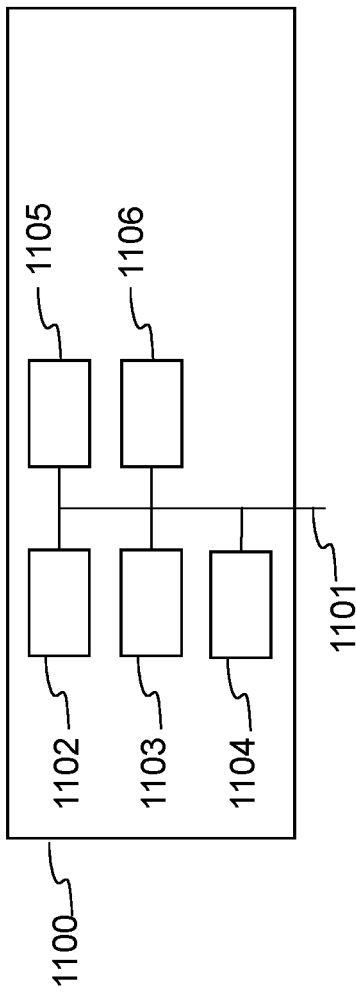
FIG. 15 shows an example of an architecture of a device in accordance with an example of the present principles.

FIG. 15 represents an exemplary architecture of a device 1100 which may be configured to implement a method described in relation with FIG. 1-14.

Device 1100 comprises following elements that are linked together by a data and address bus 1101:
- a microprocessor 1102 (or CPU), which is, for example, a DSP (or Digital Signal Processor);
- a ROM (or Read Only Memory) 1103;
- a RAM (or Random Access Memory) 1104;
- an I/O interface 1105 for reception of data to transmit, from an application; and
- a battery 1106.

In accordance with an example, the battery 1106 is external to the device. In each of mentioned memory, the word «register» used in the specification can correspond to area of small capacity (some bits) or to very large area (e.g. a whole program or large amount of received or decoded data). The ROM 1103 comprises at least a program and parameters. The ROM 1103 may store algorithms and instructions to perform techniques in accordance with present principles. When switched on, the CPU 1102 uploads the program in the RAM and executes the corresponding instructions.

RAM 1104 comprises, in a register, the program executed by the CPU 1102 and uploaded after switch on of the device 1100, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the input point cloud is obtained from a source. For example, the source belongs to a set comprising:
- a local memory (1103 or 1104), e.g. a video memory or a RAM (or Random Access Memory), a flash memory, a ROM (or Read Only Memory), a hard disk;
- a storage interface (1105), e.g. an interface with a mass storage, a RAM, a flash memory, a ROM, an optical disc or a magnetic support;
- a communication interface (1105), e.g. a wireline interface (for example a bus interface, a wide area network interface, a local area network interface) or a wireless interface (such as a IEEE 802.11 interface or a Bluetooth® interface); and
- an image capturing circuit (e.g. a sensor such as, for example, a CCD (or Charge-Coupled Device) or CMOS (or Complementary Metal-Oxide-Semiconductor)).

In accordance with an example of the decoding or a decoder, the decoded point cloud is sent to a destination; specifically, the destination belongs to a set comprising:
- a local memory (1103 or 1104), e.g. a video memory or a RAM, a flash memory, a hard disk;
- a storage interface (1105), e.g. an interface with a mass storage, a RAM, a flash memory, a ROM, an optical disc or a magnetic support;
- a communication interface (1105), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi or a Bluetooth interface);
- a rendering device; and
- a display.

In accordance with examples of encoding or encoder, the bitstream (compressed stream) is sent to a destination. As an example, the bitstream is stored in a local or remote memory, e.g. a video memory (1104) or a RAM (1104), a hard disk (1103). In a variant, the bitstream is sent to a storage interface (1105), e.g. an interface with a mass storage, a flash memory, ROM, an optical disc or a magnetic support and/or transmitted over a communication interface (1105), e.g. an interface to a point to point link, a communication bus, a point to multipoint link or a broadcast network.

In accordance with examples of decoding or decoder, the bitstream (compressed stream) is obtained from a source. Exemplarily, a bitstream is read from a local memory, e.g. a video memory (1104), a RAM (1104), a ROM (1103), a flash memory (1103) or a hard disk (1103). In a variant, the bitstream is received from a storage interface (1105), e.g. an interface with a mass storage, a RAM, a ROM, a flash memory, an optical disc or a magnetic support and/or received from a communication interface (1105), e.g. an interface to a point to point link, a bus, a point to multipoint link or a broadcast network.

In accordance with examples, the device 1100 being configured to implement an encoding method described in relation with FIG. 10 or 14, belongs to a set comprising:
- a mobile device;
- a smartphone or a TV set with 3D capture capability;
- a communication device;
- a game device;
- a tablet (or tablet computer);
- a laptop
- a still image camera;
- a video camera;
- an encoding chip;
- a still image server; and
- a video server (e.g. a broadcast server, a video-on-demand server or a web server).

In accordance with examples, the device 1100 being configured to implement a decoding method described in relation with FIG. 13, belongs to a set comprising:
- a mobile device;
- a Head Mounted Display (HMD);
- (mixed reality) smartglasses;
- an holographic device;
- a communication device;
- a game device;
- a set top box;

a TV set;

a tablet (or tablet computer);

a laptop;

a display;

a stereoscopic display; and a decoding chip.

Figure 16:
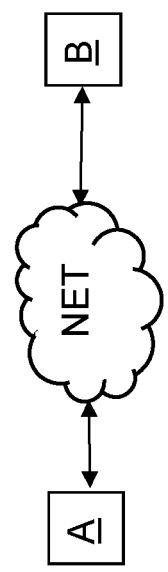
FIG. 16 shows two remote devices communicating over a communication network in accordance with an example of the present principles.

According to an example of the present principles, illustrated in FIG. 16, in a transmission context between two remote devices A and B over a communication network NET, the device A comprises a processor in relation with memory RAM and ROM which are configured to implement a method for encoding a colored point cloud as described in relation with FIG. 10 and the device B comprises a processor in relation with memory RAM and ROM which are configured to implement a method for decoding as described in relation with FIG. 13.

In accordance with an example, the network is a broadcast network, adapted to broadcast encoded colored point clouds from device A to decoding devices including the device B.

A signal, intended to be transmitted by the device A, carries the bitstream.

Figure 17:
FIG. 17 shows the syntax of a signal in accordance with an example of the present principles.

FIG. 17 shows an example of the syntax of such a signal when the data are transmitted over a packet-based transmission protocol. Each transmitted packet P comprises a header H and a payload PAYLOAD.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, a HMD, smart glasses, and any other device for processing an image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:

orthogonally projecting a first point and a second point of a point cloud on a projection plane along a same projection line; and signaling in a bitstream an information indicating whether a position on said projection line is occupied or not, wherein said information is one bit of a codeword concatenating bits representative of occupation of positions laying in-between a first depth value of said first point and a second depth value of said second point along the projection line.

2. The method of claim 1, wherein the codeword is encoded as image data.

3. The method of claim 1, wherein an information is signaled indicating whether at least one attribute of a point positioned between said first depth value and said second depth value along the projection line is encoded as image data or not.

4. A method comprising:

decoding a first depth value of a first point of a point cloud and a second depth value of a second point of the point cloud, said first point and said second point being orthogonally projected on a projection plane along a same projection line; and responsive to an information indicating that a position along said projection line is occupied, reconstructing a third point of the point cloud from said position along the projection line;

wherein said information is one bit obtained from a codeword concatenating bits representative of occupation of positions laying in-between said first depth value and said second depth value along the projection line.

5. The method of claim 4, wherein the method further comprises:

receiving, from a bitstream, said codeword.

6. The method of claim 4, wherein the codeword is obtained from image data.

7. The method of claim 4, wherein said first depth value is obtained from a first geometry image and said second depth value is obtained from a second geometry image.

8. The method of claim 5, wherein the method further comprises obtaining, from a bitstream, an information indicating whether at least one attribute of a point positioned between said first depth value and said second depth value along the projection line is obtained from image data or from at least one attribute of other points of the point cloud.

9. The method of claim 6, wherein the method further comprises signaling an information indicating how the codeword is obtained from image data.

10. The method of claim 8, wherein the method further comprises obtaining an information indicating how at least one attribute of a point is obtained from image data.

11. A device comprising at least one processor configured to:

orthogonally project a first point and a second point of a point cloud on a projection plane along a same projection line; and signal in a bitstream an information indicating whether a position on said projection line is occupied or not, wherein said information is one bit of a codeword concatenating bits representative of occupation of positions laying in-between a first depth value of said first point and a second depth value of said second point along the projection line.

12. The device of claim 11, wherein the codeword is encoded as image data.

13. The device of claim 11, wherein an information is signaled indicating whether at least one attribute of a point positioned between said first depth value and said second depth value along the projection line is encoded as image data or not.

14. A device comprising at least one processor configured to:

decode a first depth value of a first point of a point cloud and a second depth value of a second point of the point cloud, said first point and said second point being orthogonally projected on a projection plane along a same projection line; and responsive to an information indicating that a position along said projection line is occupied, reconstruct a third point of the point cloud from said position along the projection line;

wherein said information is one bit obtained from a codeword concatenating bits representative of occupation of positions laying in-between said first depth value and said second depth value along the projection line.

15. The device of claim 14, wherein the codeword is obtained from image data.

16. The device of claim 14, wherein the one or more processors are further configured to obtain, from a bitstream, an information indicating whether at least one attribute of a point positioned between said first depth value and said second depth value along the projection line is obtained from image data or from at least one attribute of other points of the point cloud.

17. A non-transitory computer-readable medium including instructions for causing one or more processors to perform:

orthogonally projecting a first point and a second point of a point cloud on a projection plane along a same projection line; and signaling in a bitstream an information indicating whether a position on said projection line is occupied or not, wherein said information is one bit of a codeword concatenating bits representative of occupation of positions laying in-between a first depth value of said first point and a second depth value of said second point along the projection line.

18. The non-transitory computer-readable medium of claim 17, wherein the codeword is encoded as image data.

19. A non-transitory computer-readable medium including instructions for causing one or more processors to perform:

decoding a first depth value of a first point of a point cloud and a second depth value of a second point of the point cloud, said first point and said second point being orthogonally projected on a projection plane along a same projection line; and responsive to an information indicating that a position along said projection line is occupied, reconstructing a third point of the point cloud from said position along the projection line;

wherein said information is one bit obtained from a codeword concatenating bits representative of occupation of positions laying in-between said first depth value and said second depth value along the projection line.

20. The non-transitory computer-readable medium of claim 19, wherein the codeword is obtained from image data.

* * * * *